United States Patent [19]

Sato et al.

[11] Patent Number: 5,751,589

[45] Date of Patent: May 12, 1998

[54] METHOD FOR CREATING A MACHINING CONDITION SERIES

[75] Inventors: Tatsushi Sato; Tomoko Sendai, both of Hyogo, Japan

[73] Assignee: Mitsubishi Denki Kabushiki Kaisha, Tokyo, Japan

[21] Appl. No.: 255,819

[22] Filed: Jun. 7, 1994

Related U.S. Application Data

[63] Continuation of Ser. No. 792,632, Nov. 15, 1991, abandoned.

[30] Foreign Application Priority Data

Nov. 20, 1990 [JP] Japan ................. 2-314510

[51] Int. Cl.$^6$ ................. G06F 17/00; G05B 13/02
[52] U.S. Cl. ................. 364/474.35; 364/148; 364/152; 364/474.04
[58] Field of Search ................. 364/474.04, 474.03, 364/474.15, 474.16, 474.35, 474.28, 148, 152, 153, 154, 172; 395/903, 900, 904

[56] References Cited

U.S. PATENT DOCUMENTS

| | | | |
|---|---|---|---|
| 3,784,798 | 1/1974 | Beadle et al. | 364/474.15 |
| 3,829,750 | 8/1974 | Centner et al. | 364/474.15 |
| 4,031,368 | 6/1977 | Colding et al. | 364/474.15 |
| 4,992,948 | 2/1991 | Pilland et al. | 364/474.15 |
| 4,994,980 | 2/1991 | Lee et al. | 364/474.15 |
| 5,117,083 | 5/1992 | Kawamura | 395/904 |
| 5,200,905 | 4/1993 | Uemoto et al. | 364/474.04 |
| 5,216,218 | 6/1993 | Sasaki | 395/904 |
| 5,267,141 | 11/1993 | Morita et al. | 364/152 |

FOREIGN PATENT DOCUMENTS

| | | |
|---|---|---|
| 130131 | 6/1987 | Japan . |
| 62-130130 | 6/1987 | Japan . |
| 62-130131 | 6/1987 | Japan . |

OTHER PUBLICATIONS

Edmund Fiebig et al., "Automatisierung Für Kaltwalz–Tandemstrassen", etz Bd 101 (1980), Heft 21, pp. 1160–1165.

Von H.J. Enning, "Oberflächen Und Gebrauchseigenschaften Funkenerosiv Bearbeiteter Werkstücke", Technische Mitteilungen 73, Jahrgang, Heft 11/2, Nov./Dec. 1980, pp. 936–943.

Dipl.–Ing. Manfred Feurer, "Elektroerosive Metallbearbeitung", Vogel–Buchverlag, 1983, pp. 94–111.

Prof. Dr.–Ing. Wilfried König, "Fertigungsverfahren Band 3 Abtragen", VDI–Verlag GmbH, 1979, pp. 26–39.

*Primary Examiner*—Reba I. Elmore
*Assistant Examiner*—Brian L. Oakes
*Attorney, Agent, or Firm*—Sughrue, Mion, Zinn, Macpeak & Seas

[57] ABSTRACT

A method for creating machining conditions and/or machining condition series capable of meeting a plurality of required machining specifications, in which the method designates at least one of ranges of the machining specifications, ranges of satisfaction degrees for the required specifications and functions indicating satisfaction degrees to the required specifications. The method determines a compromise between the required machining specifications. The required machining specifications includes surface roughness, consumption rate of the electrode and machining time.

11 Claims, 4 Drawing Sheets

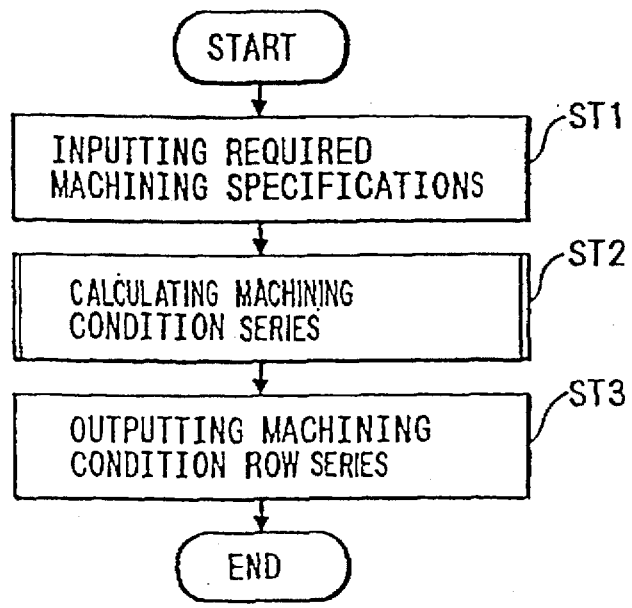
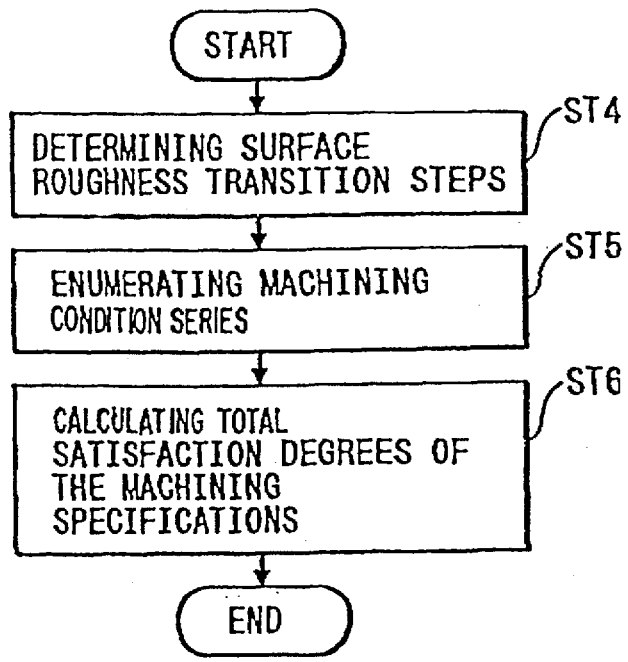

METHOD FOR CREATING A MACHINING CONDITION SERIES

This is a continuation of application Ser. No. 07/792,632 filed Nov. 15, 1991 now abandoned.

BACKGROUND OF THE INVENTION

This invention relates to a method of creating at least one set of machining parameters referred to herein as a "machining condition series" for use in a machine tool, such as a discharge machining system.

Conventionally, the machining conditions for operating the machine tool are determined on the basis of required workpieces specifications and the machine operator's experience and knowledge. For example, in discharge machining, the machine operator determines the machining condition series on the basis of finished surface roughness, shape characteristics and the like of the workpiece, and inputs the data to machine tool. In the discharge machining and other types of machining, generally, phased processes from roughing to finishing are used to obtain the required roughness and improve the machining speed. Planning for changing the machining conditions is carried out on the basis of the operator's knowledge.

When the machine tool is operated, the experience and knowledge of a skilled operator is indispensable in determining the machining conditions and the machining condition series. However, through rapid progress in data processing technology, as described in Japanese Patent Laid-Open No. 62-130130 and Japanese Patent Laid-open No. 62-130131, there has been achieved an apparatus for creating a machining condition series which automatically calculates the machining conditions on the basis of data on the machining electrode and the workpiece.

FIG. 5 is a block diagram outlining a conventional method of creating a machining condition series. In FIG. 5, reference numeral 1 designates an input section for operator input of parameters such as the machining base area, machining depth, a finished surface roughness, electrode wear amount, etc. on the basis of the machining specifications of the workpiece. Further, reference numeral 2 designates a unit for generating a machining condition series which produces the machining conditions and the machining condition series on the basis of machining characteristic data 4 and the inputted data from the input section 1. The machining characteristic data 4 includes data on the workpiece.

The operation of the above conventional method is as follows:

When the operator inputs machining base area, machining depth, finished surface roughness, electrode wear amount, etc., on the basis of the machining specifications of the workpiece, the unit 2 produces the machining condition and the machining conditions series on the basis of the inputted data from the input section 1 and the machining characteristic data 4 prepared in advance. Moreover, the machining condition series is displayed in the same state as the form being inputted to the machine tool, or e.g. is printed out. Additionally, a plurality of the machining condition series are indicated together with the respective estimated times for machining, and the indicated data may be selected by the operator.

In general, when high finishing precision is required, a machining speed rapidly slows down. For example, FIG. 6 is a graph indicating the relation between surface roughness and machining-speed, classified by wear rate of the electrode in discharge machining. In FIG. 6, when the finished surface roughness is decreased from 25 $\mu mR_{max}$ to 12.5 $\mu mR_{max}$, the machining increases five to seven-fold. That is, increasing finished surface precision causes the machining time to be rapidly extended. Therefore, in order to reduce production cost and machining time, the finished surface roughness as far as possible on the "rough" side while still obtaining satisfactory product.

The conventional method of creating a machining condition series comprising the above steps is disadvantageous in the following way. The machining specifications are indicated by absolute numerical values. Frequently, the production cost and machining time could both be lowered by a little moderation in the machining specifications, however the operator can not recognize how to achieve this end.

Furthermore, workpiece precision has an inverse relation with and large influence on machining speed. However, in designing a workpiece detailed decisions on machining precision data, e.g. the finished surface roughness, are unusual, and the machining precision data are divided into classes having relatively wide ranges. Accordingly, in machining, the operator flexibly interprets the machining precision parameters taking into consideration the importance of the workpiece, the operating conditions, the delivery deadline and the like and makes a compromise between machining speed and machining precision. That is, when each machining specification is set at a singular value, it takes much time to find a suitable compromise between machining speed and machining precision.

SUMMARY OF THE INVENTION

Accordingly, an object of this invention is to eliminate the above-described difficulties accompanying the conventional method for creating a machining condition series. Specifically, an object of the invention is to provide a method of creating at least one machining condition series in which the machining specifications are flexibly interpreted, and, even if the operator is unskilled. The processing conditions and the machining conditions series preferably are generated in view of machining precision and machining speed.

In the method of creating a machining condition series according to the invention, the input values to the section which the machining condition row are provided with respective certain ranges and/or functions and/or certain ranges which indicate the respective "satisfaction degrees" relating to the machining specifications are determined.

In the method according to the invention, the operator inputs at least one of range limits or "satisfaction degrees" functions for a plurality of machining specifications on the basis of the importance of the workpiece, the operating conditions and the like so as to determine a compromise between the machining specifications. As the result, a machining condition series satisfying all of machining specifications are created.

BRIEF DESCRIPTION OF THE DRAWINGS

FIG. 3 and FIG. 4 are flow-charts showing the operation of a method for creating a machining condition series which constitutes one embodiment of the invention.

EMBODIMENT(S) OF THE INVENTION

One preferred embodiment of this invention, a method for creating a machining condition series, will be described with reference to the accompanying drawings.

Figure 1:
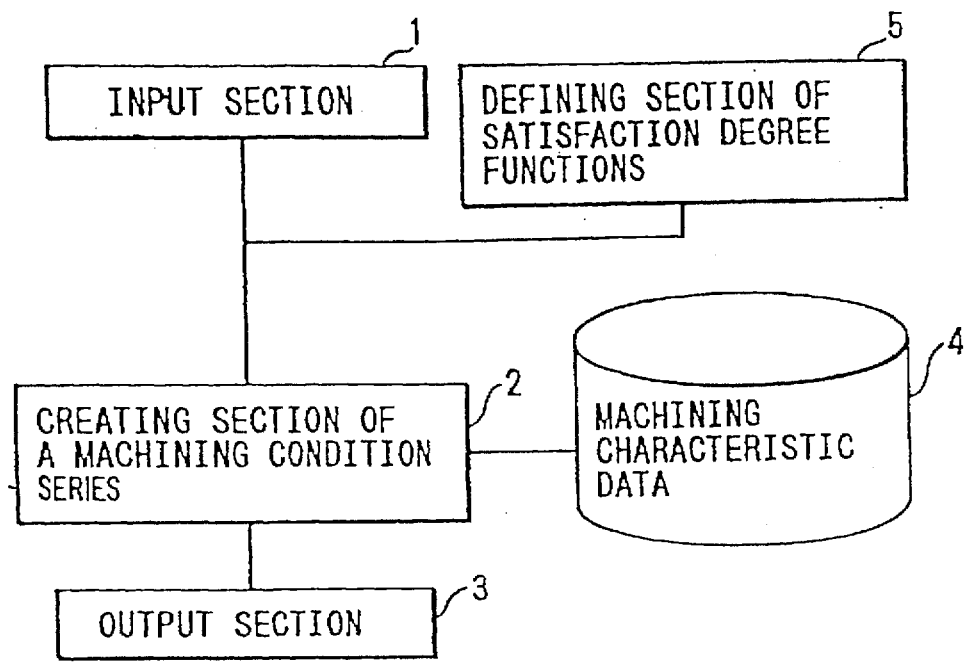
FIGS. 1 is a block diagram outlining a method for creating a machining condition row which constitutes one embodiment of the invention.
Figure 5:
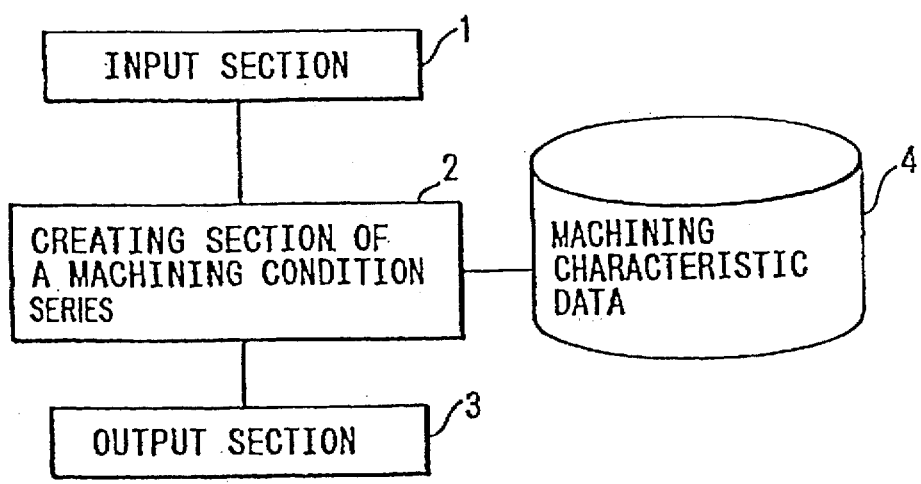
FIG. 5 is a block diagram outlining a conventional method of creating a machining condition series.

FIG. 1 is a block diagram outlining a method for creating a machining condition series which constitutes one embodiment of the invention. Each portion of the embodiment corresponding to the conventional method (FIG. 5) is designated by the same numeral, and explanation thereof will be omitted.

In FIG. 1, reference numeral 5 designates a section which defines satisfaction degree functions and which designates therein ranges of the machining specifications and/or satisfaction degree functions.

The operation of the above embodiment will be described with reference to the flow charts of FIGS. 3 and 4.

Figure 2A:
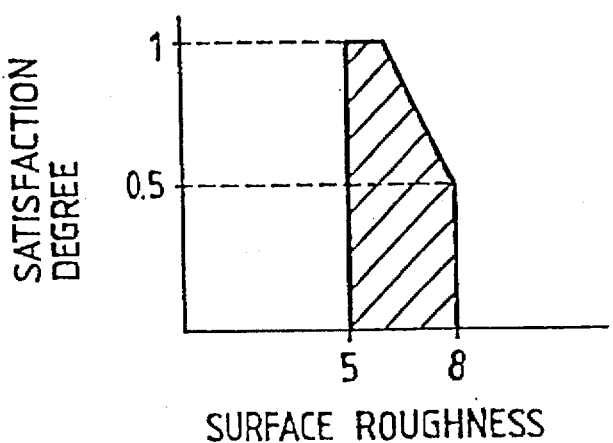
FIG. 2(a), FIG. 2(b) and FIG. 2(c) are graphs indicating satisfaction degree functions, respectively.
Figure 2B:
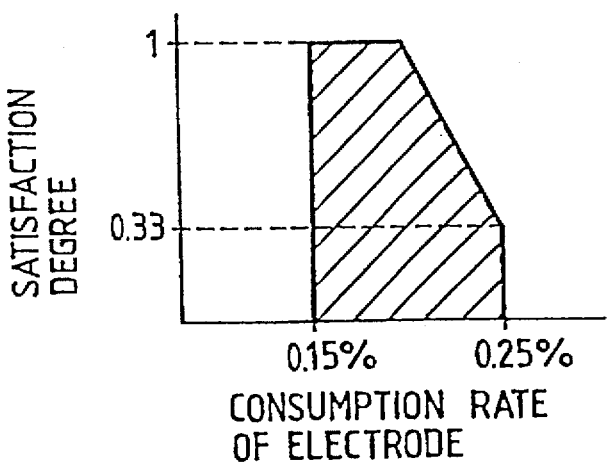
Figure 2C:
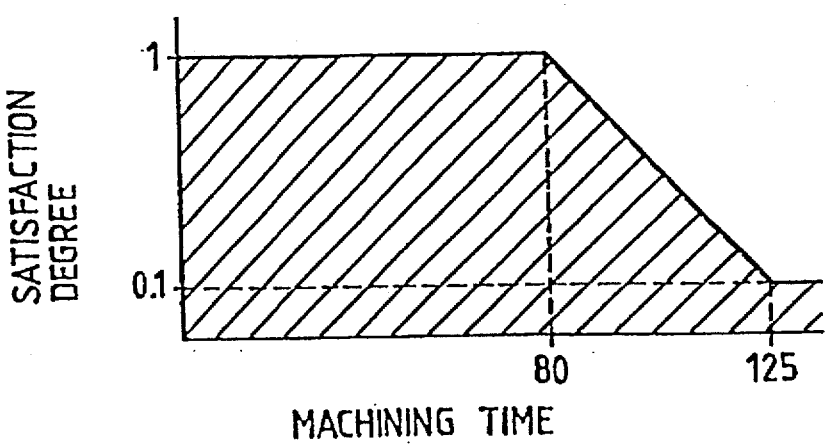
Figure 6:
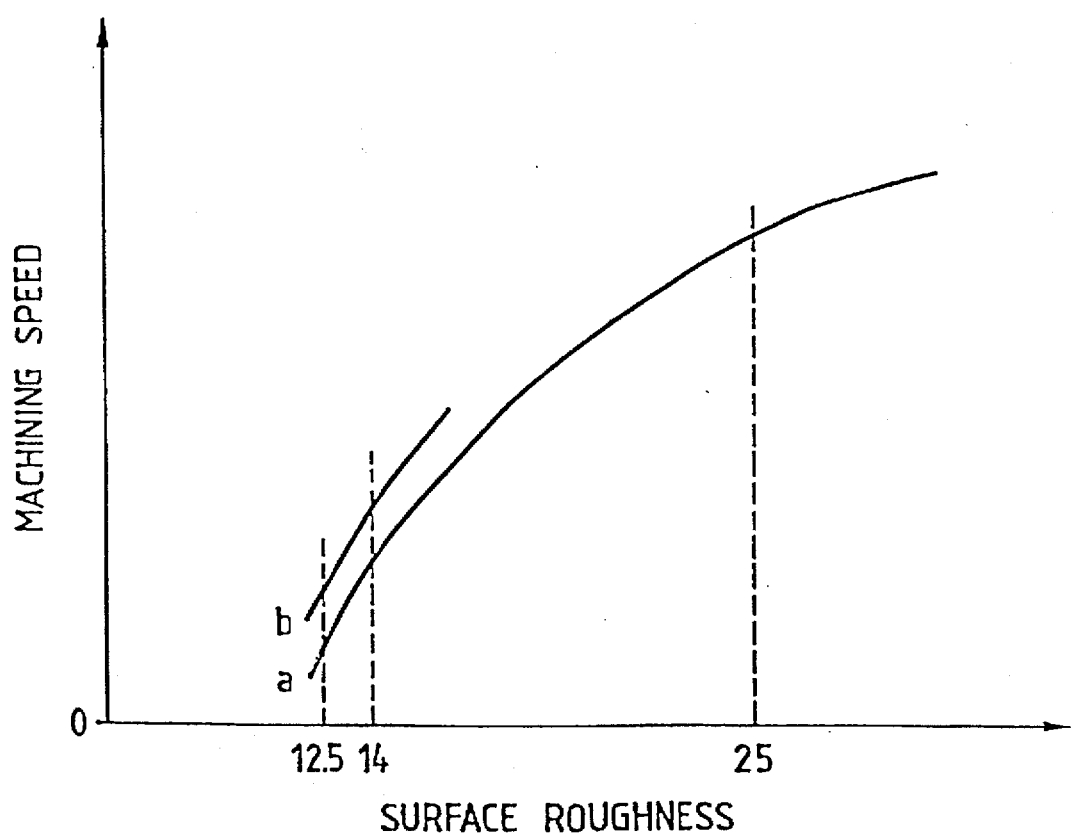
FIG. 6 is a graph indicating a characteristic of surface roughness—machining speed classified by wear rate of an electrode in discharge machining.

An operator inputs data on finished surface roughness (FIG. 2(a)), wear rate of the electrode (FIG. 2(b)) and machining time (FIG. 2(c)) to the section 5 defining the satisfaction degree functions as machining specifications including a range and a satisfaction degree within this range as shown in FIGS. 2(a)–2(c). The operator also inputs, machining specifications to the input section 1 which are not designated by satisfaction functions, e.g. the workpiece material or the like (Step ST1). After inputting the above data, the creating section 2 calculates the machining condition series based on previously stored machining characteristic data 4 (Step ST2). In this step ST2 (FIG. 4), surface roughness transition steps are determined based on the required surface roughness (Step ST4). Namely, the number of the machining stages are determined, and the target surface roughness in each stage is determined. Next, the machining conditions (electrical parameters) needed to realize the surface roughness in each machining stage are selected from the previously memorized machining characteristics data 4, so that all combinations of machining conditions from the first stage to the final stage of machining are enumerated to define the machining condition series (Step ST5). Further, with respect to each machining condition series enumerated in step ST5, the finished surface roughness, the wear rate of the electrode and the machining time are calculated. Then, the "satisfaction degree" of each machining specification corresponding to the calculated data is deduced from the inputted satisfaction degree functions for the machining specifications of three kinds. Hereupon, the deduced satisfaction degrees are multiplied by each other, so that the total satisfaction degree of the machining specifications of the respective machining electric condition series are calculated (Step ST6).

With respect to those machining electric condition series providing high values of the total satisfaction degree calculated in step ST6, the creating section 2 generates machining conditions such as machining step number and peak current, pulse width, rest time, polarity and power source waveform to be used in each machining step. Additionally, the creating section 2 creates the machining condition series for parameters such as electrode reduction margin, servo-mode, jump mode, finishing depth of the machining, roll type and roll degree. Finally, the output section 3 indicates these data to the operator with the respective total satisfaction degrees of the processing specifications and the estimated machining time (Step ST3).

For example, as machining specifications for discharge machining, it is assumed that the finished roughness is not more than 6 $\mu mR_{max}$ and that the wear rate of the electrode is not more than 0.2%. In machining, when the operator wishes to create machining conditions realizing a finished surface roughness of 8 $\mu m$–5 $\mu mR_{max}$ and a consumption rate of 0.15%–0.25% with consideration given to the characteristics of the workpiece, the satisfaction degree is 50% with surface roughness 8 $\mu m$, or 33% wear rate of 0.25%, as shown in FIG. 2(a) and FIG. 2(b). Alternately, as shown in FIG. 2(c), where the satisfaction degree is designated so as to gradually reduce with a machining time between 80 min. and 125 min. and finally set at 10% with consideration given to the operating state of the machining machine, and furthermore with the conditions of an electrode area and machining depth designated, the machining condition series including the finished surface roughness of 6.8 $\mu m$, the wear rate of 0.2% and machining time 101 min. are created.

At this time, the operator may designate some parts of the output, e.g. the electrode reduction margin or the servo-mode, before creating the machining condition series. This designation may be performed by using satisfaction degree functions like with the machining specifications as occasion calls.

On the other hand, in the above example, each machining specification is designated by a range and a satisfaction degree function of the machining specification within the range. However, the machining specifications may be designated only by the respective range. In the case, for example, the finished surface roughness and the wear rate of the electrode are designated in the range between [8 $\mu m$, 0.15 %]–[5 $\mu m$, 0.25%], and the machining time is designated to be within 125 min. The machining condition series may be indicated to the operator in order of forecast machining time or the finished surface roughness or the wear rate of the electrode. In the creation of the machining condition series, the calculation above may be able to be performed presuming that the satisfaction degree within the designated range is uniformly 100%. Therefore, an appraisal function may be used where the satisfaction degree is 100% within the range and 0% when out of the range.

In the above example, the designation of the machining specifications by the operator, in the form of a range and as a satisfaction degree function within the range, may be arranged such that a plurality of the preferable functions are prepared, and then the operation designating only the parameters for determining each function results to input the satisfaction degrees of the machining specifications, wherein, for example, the parameters are a position for a maximum value of the function and a value range for the function. As a result, the inputting process becomes simple. On the other hand, the same effect is obtained where when the range is inputted a predetermined default function form is selected.

Furthermore, the function form may be displayed on the conventional output device, e.g. a CRT, so that the estimation function is confirmed visually. In this case, a position for a maximum value of the function, the maximum value of the function and a value range for the function or the like may be moved on the display device by input devices such as a button, a key, a Joystick, a light-pen, a mouse or the like. This arrangement is able to determine the function form by by a simple input operation. Additionally, the output section may be arranged to directly output a program of the machining condition to a control device of the machine tool other than for the operator. As a result, a in job in which the operator has selected one of a plurality of the machining condition series can be is saved.

The calculation of the total satisfaction degree of the individual machining specifications from the satisfaction degrees of each machining specification, is not limited to mere multiplication, but may be performed by any calculating method including a simple increase or a simple decrease according to an increase or decrease in the satisfaction degrees of the machining specifications, e.g. a weighted linear addition, or the addition of a square.

In addition to the above example which is described on the basis of machine operator usage, the present method may be used for estimating machining time or machining expense when the machining specifications are changed, to determine an optimum design of the workpiece or the optional machining scheme. In addition to the above example in which the creation of the machining condition series is described with reference to a discharge machining apparatus, the present invention may be used to create machining condition series for a laser machining apparatus, a numerically controlled machining apparatus or other kind of grinder, in which the creation thereof has the same effect as in the above example.

As was described above, in the method of the invention, input machining specifications are designated by at least one of a range and a value and/or a function indicating a satisfaction degree. Accordingly, even a non-skilled operator of these machines can obtain an optimum machining condition and/or machining condition series. Specifically, the invention is effective in machining in which the minimum change of the machining precision has a large influence upon the machining time. Furthermore, to independent creation of the machining conditions or machining condition series each time where the machining specifications are little different form each other, respectively, is not necessary.

What is claimed is:

1. A method of automatically generating machining condition series meeting a plurality of required machining specifications, said machine condition series being used at least as operating parameters for a machine tool, the method comprising the steps of:

designating ranges for the machining specifications including required values of said machining specifications, and satisfaction degree functions indicating satisfaction degrees relating to user desirability of said specifications within said ranges;

constructing a number of machining steps realizing values in said ranges for at least one type of said machining specifications; selecting machining conditions realizing said steps, respectively, from previously stored data of machining conditions;

enumerating all combinations of the selected machining conditions, as machining series, said combinations each being capable of realizing values in said ranges, respectively;

calculating total satisfaction degrees with respect to said machining condition series, respectively, by multiplying said satisfaction degrees by one another relative to specifications which are met by each said machining condition series, in which each said satisfaction degree is obtained from said functions based on the value of each specification as met by each said machining condition series; and selecting a machining condition series having a high total satisfaction degree.

2. A method according to claim 1, in which said machining specifications include surface roughness, consumption rate of an electrode and machining time.

3. A method according to claim 2, wherein said one type of machining specifications is surface roughness.

4. A method according to claim 1, wherein said machining conditions in said selecting step are electrical machining parameters.

5. A method according to claim 1, wherein in said step of designating functions, said functions are selected from the previously stored function data by inputting parameters which indicate characteristics of said stored function data.

6. A method according to claim 1, wherein the calculating results of said multiplication in said calculating step increases or decreases at an uniform rate.

7. A method of automatically generating machining condition series meeting a plurality of required machining specifications, said machine condition series being used as parameters for operating a machine, the method comprising the steps of:

designating ranges of the machining specifications including required values of said machining specifications;

designating a satisfaction degree function for each of said ranges of machining specifications, wherein said satisfaction degree functions indicate the desirability of the values within said ranges of machining specifications;

constructing a number of machining steps realizing values in said ranges for at least one kind of said machining specifications;

selecting machining conditions realizing said steps, respectively, from previously stored data of machining conditions;

enumerating all combinations of the selected machining conditions, as machining condition series, said combinations being capable of realizing a plurality of values in said ranges, respectively; and selecting machining condition series based on said satisfaction degree functions.

8. A method according to claim 7, wherein said step of selecting machine condition series based on said satisfaction degree functions further comprises the steps of:

presupposing satisfaction degrees of 100% when each value of the specification realized by said each machining condition series is within said designated range, the satisfaction degrees indicating the degrees to which the specification values realized by said combinations satisfy said required specifications; and selecting machining condition series optimally meeting said required machining specifications, of which said satisfaction degrees relative to every value of said specifications performed by one machining condition series is 100%.

9. A method according to claim 7 in which said specifications include a surface roughness, a wear rate of an electrode and a machining time.

10. A method according to claim 7, wherein said one kind of specification is a surface roughness.

11. A method according to claim 7, wherein said machining conditions in said selecting step are electrical machining conditions.

* * * * *